US006575259B2

(12) United States Patent
Buell et al.

(10) Patent No.: US 6,575,259 B2
(45) Date of Patent: Jun. 10, 2003

(54) MOTORCYCLE SWING ARM HAVING REMOVABLE SECTION TO FACILITATE REMOVAL OF FLEXIBLE DRIVE MEMBER

(75) Inventors: Erik F. Buell, Mukwonago, WI (US); Christopher L. Fiorini, Burlington, WI (US); Vance C. Strader, New Berlin, WI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 09/901,482

(22) Filed: Jul. 9, 2001

(65) Prior Publication Data

US 2003/0006078 A1 Jan. 9, 2003

(51) Int. Cl.[7] .......................... B62D 61/02; B62M 7/00
(52) U.S. Cl. ........................ 180/219; 180/231; 180/227
(58) Field of Search ............................... 180/219, 221, 180/231, 227; 280/284–286

(56) References Cited

U.S. PATENT DOCUMENTS

| 4,540,193 A | * | 9/1985 | Noda et al. ................. 180/219 |
| 4,821,833 A | * | 4/1989 | Yamaguchi ................. 180/219 |
| 4,993,508 A | * | 2/1991 | Nozoe et al. ............... 180/219 |
| 5,469,930 A | * | 11/1995 | Wiers ......................... 180/219 |
| 5,960,902 A | * | 10/1999 | Mancini et al. ............. 180/227 |

* cited by examiner

Primary Examiner—Lesley D. Morris
Assistant Examiner—Matthew Luby
(74) Attorney, Agent, or Firm—Michael Best & Friedrich LLP

(57) ABSTRACT

A motorcycle includes a swing arm defining a drive member aperture through which a flexible drive member extends. During normal operation of the motorcycle, the drive member and swing arm are interlocked due to a portion of the drive member being captured in the drive member aperture. A portion of the swing arm is removable from the rest of the swing arm to open the drive member aperture and permit removal of the drive member as a continuous unbroken loop without the need to drop the motorcycle's transmission.

21 Claims, 4 Drawing Sheets

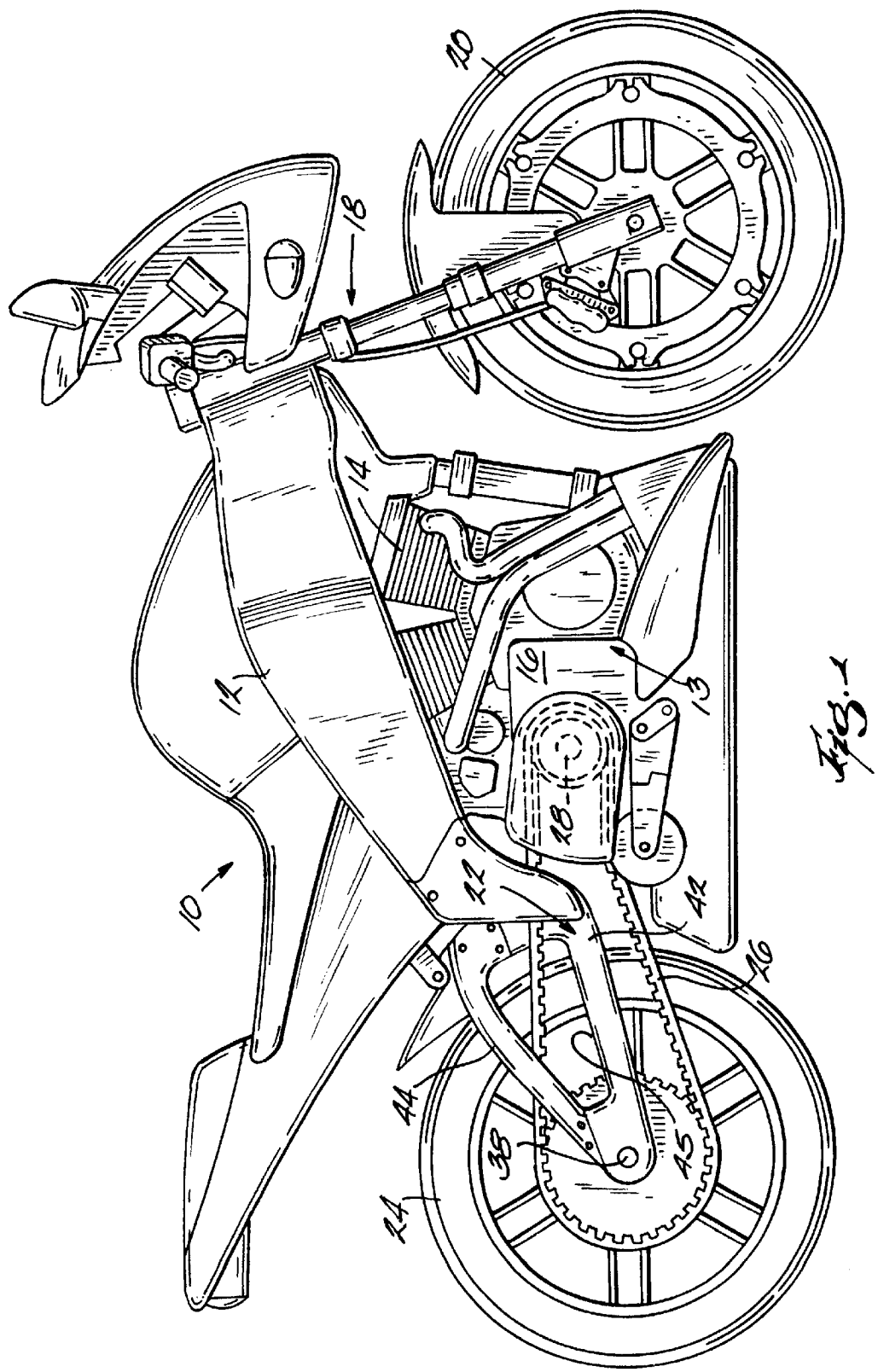

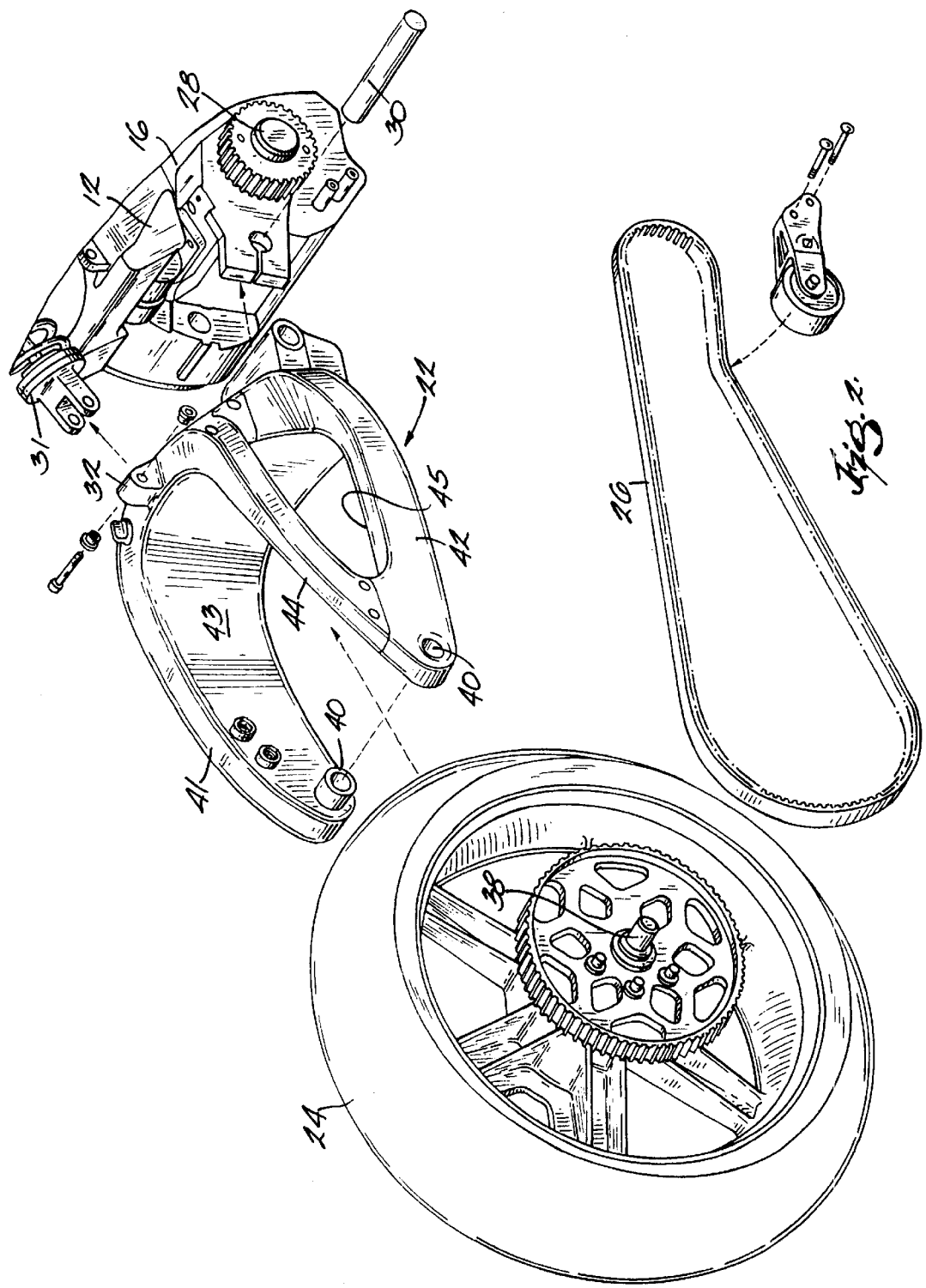

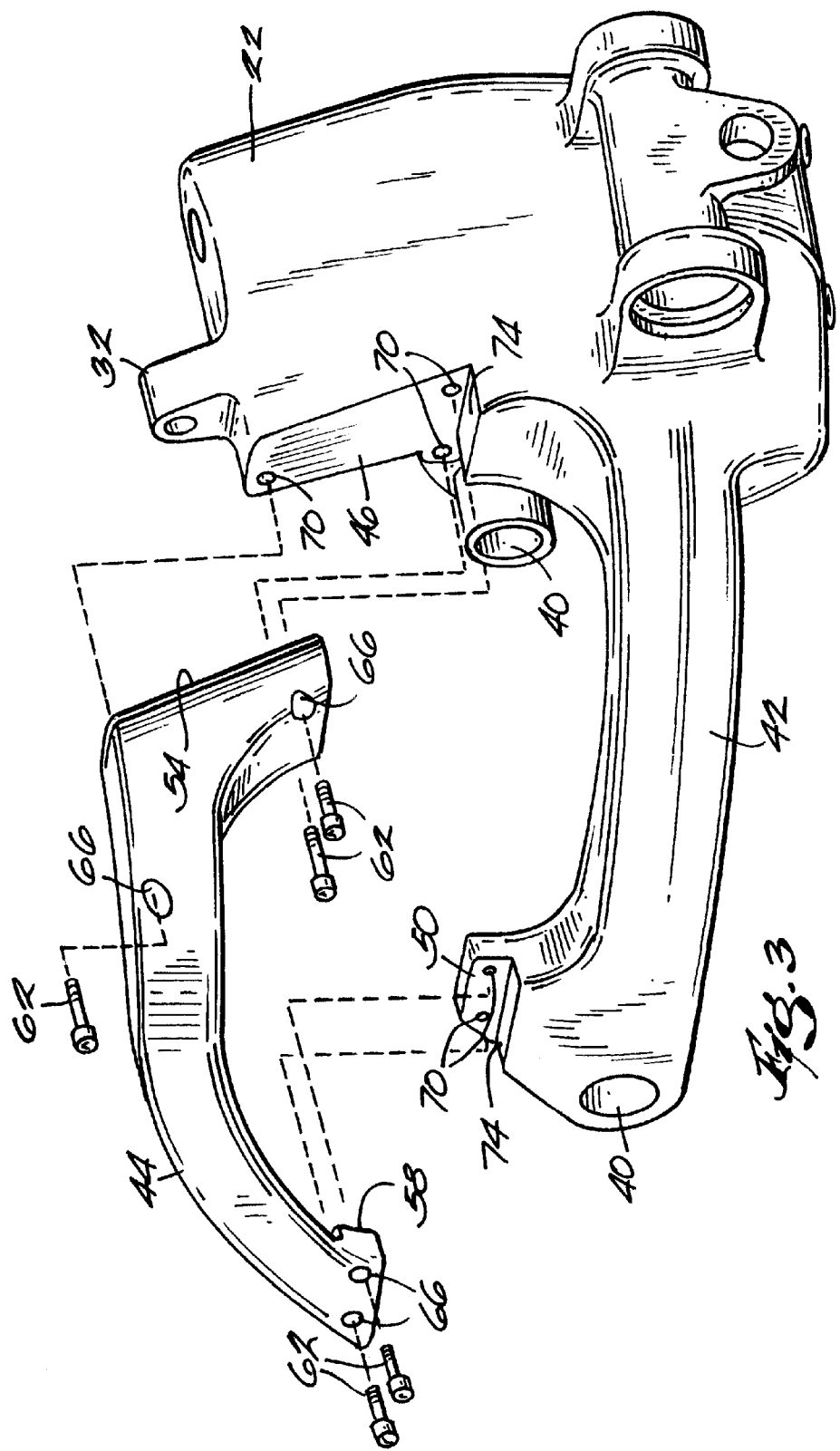

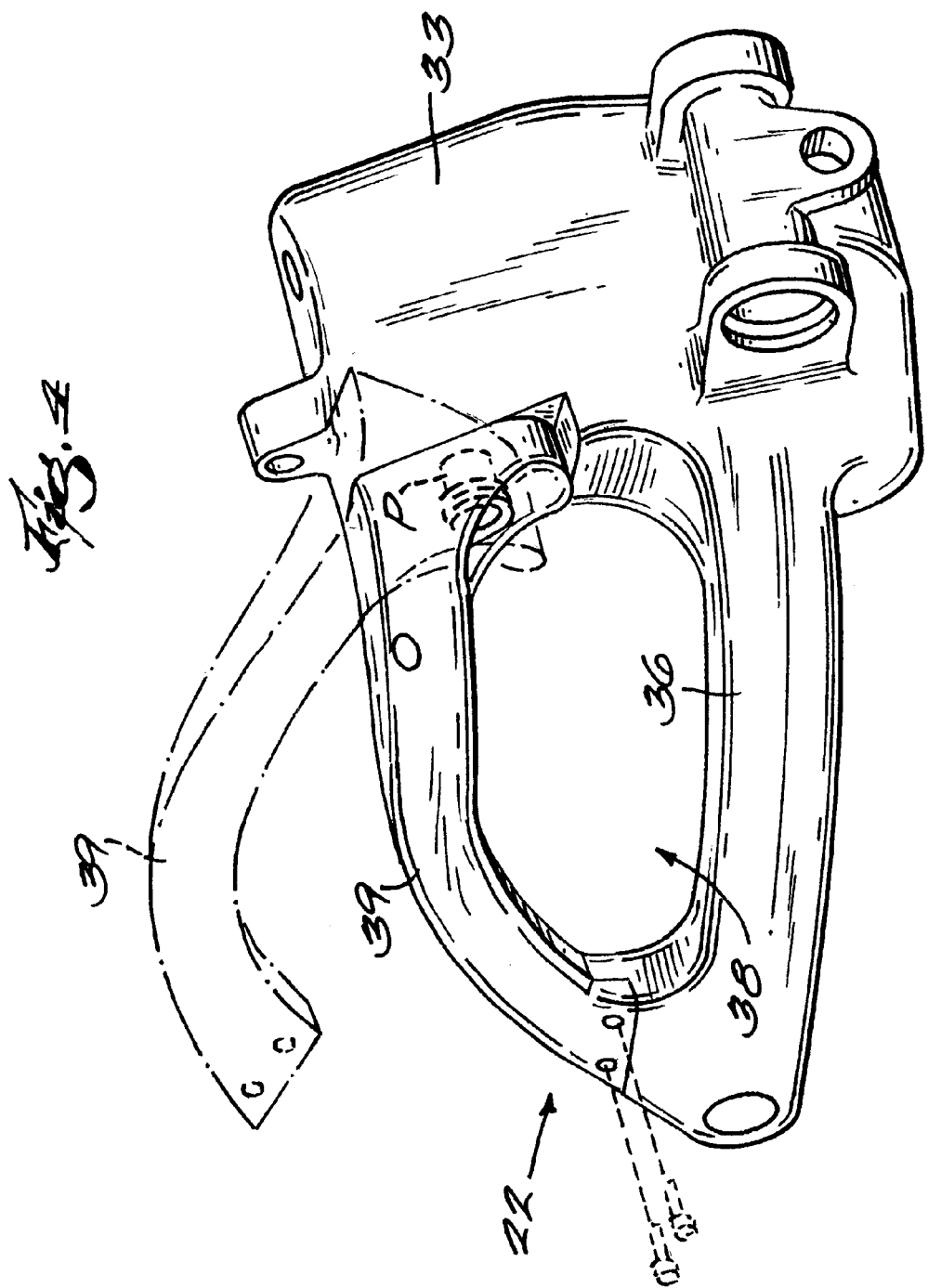

MOTORCYCLE SWING ARM HAVING REMOVABLE SECTION TO FACILITATE REMOVAL OF FLEXIBLE DRIVE MEMBER

BACKGROUND

The invention relates to swing arms for motorcycles. One type of swing arm is a truss structure, which is often in the shape of a pair of triangles. Motorcycles employing a truss style swing arm typically position the flexible drive member (such as a drive belt) between the swing arm and the rear wheel. It is usually necessary to break the loop defined by the drive member or to drop the transmission prior to removing the drive member from its operative position. Dropping the transmission is a known way to create a gap between the transmission and the frame and/or swing arm through which the drive member may be removed in an unbroken loop.

Another type of swing arm is a single forked swing arm that includes only one arm on each side of the tire (i.e., without the supporting members of the truss structure). The drive belt can be removed from a motorcycle having a single fork swing arm without dropping the transmission, but the single forked swing arm does not provide the stability of the truss structure.

SUMMARY

The invention provides a motorcycle including a frame and an engine/transmission assembly that is mounted to the frame and includes an engine and a transmission operatively interconnected with the engine. The transmission includes an output shaft rotating in response to operation of the engine. The motorcycle further includes at its front end a steering assembly mounted to the frame and a front wheel rotatably mounted to the steering assembly. At its rear end, the motorcycle further includes a swing arm pivotably mounted to the frame and/or the transmission and a wheel rotatably mounted to the swing arm.

The swing arm defines a drive member aperture therethrough, and includes a removable portion. The drive member aperture may be selectively opened and closed by removing and attaching the removable portion, respectively, with respect to the swing arm. A flexible drive member is operatively interconnected between the transmission output shaft and the rear wheel to cause rotation of the rear wheel in response to operation of the engine. A portion of the drive member extends through the drive member aperture. The flexible drive member is thus removable from the motorcycle in a continuous unbroken loop by removing the removable portion from the rest of the swing arm and opening the drive member aperture.

Other features and advantages of the invention will become apparent to those skilled in the art upon review of the following detailed description, claims, and drawings.

BRIEF DESCRIPTION OF THE DRAWINGS

FIG. 1 is a side elevation view of a motorcycle embodying the present invention.

FIG. 2 is an enlarged exploded view of the rear portion of the motorcycle of FIG. 1.

FIG. 3 is an enlarged exploded view of the swing arm and truss member of the motorcycle of FIG. 1.

FIG. 4 is a perspective view of an alternative construction of the swing arm.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 that includes a frame 12 and an engine/transmission assembly 13 connected to the frame 12. The engine/transmission assembly 13 includes an engine 14 and a transmission 16 connected to the engine 14. The engine 14 and the transmission 16 of the engine/transmission assembly 13 could either include a single integral housing or separate housings connected together. The motorcycle also includes a steering assembly 18 mounted to the front of the frame 12, a front wheel 20 rotatably mounted to the steering assembly 18 and supporting the front end of the motorcycle 10, a swing arm 22 pivotally interconnected to the transmission 16, and a rear wheel 24 rotatably mounted to the swing arm 22. A drive member, such as a chain or the illustrated drive belt 26 interconnects the rear wheel 24 with an output shaft 28 of the transmission 16.

FIG. 2 better illustrates the rear portion of the motorcycle 10. The swing arm 22 is pivotably mounted to the transmission 16 with a pivot member 30, such as a pin or bolt. Alternatively, the swing arm 22 may be pivotably mounted to the frame 12 alone, or to the frame 12 and transmission 16. A spring or shock absorber 31 is pivotably interconnected to a boss 32 on the top front portion of the swing arm 22. The shock absorber 31 is interconnected to the frame 12 at its opposite end and absorbs shocks and dampens vibrations to give the rider of the motorcycle 10 a more comfortable ride. A rear wheel axle 38 is fixed with respect to the swing arm 22 in bearings 40. In this regard the axle 38 is termed a "fixed-position" and "non-adjustable" component with respect to the swing arm 22.

As shown in FIGS. 2 and 3, the swing arm 22 includes first and second sides 41, 42 that extend along opposite sides of the rear wheel 24. The first side 41 defines a solid wall 43. A truss member 44 is mounted to the second side 42 of the swing arm 22. The swing arm 22 may thus be considered a single fork type of swing arm, with a removable truss member 44. Alternatively, the truss member 44 may be considered a removable portion of the swing arm 22 rather than a structure separate from the swing arm 22. The truss member 44 and the swing arm 22 together define a drive member aperture 45.

As used herein with respect to the truss member 44, "removable" means that the truss member 44 is selectively movable to open and close the drive member aperture 45, whether the truss member 44 is completely removed from the rest of the swing arm 22 or not. For example, in the alternative construction illustrated in FIG. 4, the truss member 44 is pivotally interconnected with the rest of the swing arm 22 with a pin or other pivot member P. The truss member 44 is pivotable to an open position shown in phantom wherein the aperture 45 is open. The truss member 44 in FIG. 4 is still considered "removable" with respect to the rest of the swing arm 22 because it is selectively movable to open and close the aperture 45. It should also be noted that the entire truss member 44 need not be pivoted, but only a portion sufficient to open the aperture 45 enough to permit removal and replacement of the belt 26.

Referring to FIG. 3, the swing arm 22 includes first and second substantially vertical mounting surfaces 46, 50 and the truss member 44 includes third and fourth substantially vertical mounting surfaces 54, 58 mating with the first and second surfaces 46, 50, respectively. In alternative embodiments, two or all four of the mating vertical surfaces 46, 50, 54, 58 may be non-vertically or horizontally oriented. The truss member 44 is interconnected with the second side 42 of the swing arm 22 with horizontally-oriented fasteners, such as the illustrated bolts or screws 62. Through-bores 66 extend through the truss member 44 and register with threaded bores 70 in the first and second vertical surfaces 46, 50. The bolts 62 extend through the through-bores 66 and thread into the threaded bores 70. The swing arm 22 also includes substantially horizontal support surfaces 74 that provide further support for the truss member 44 and reduce or eliminate shear stress on the bolts 62.

During normal operation of the motorcycle 10, the truss member 44 is affixed to the swing arm 22 as shown in FIGS. 1 and 2. The aperture 45 is said to be "closed" when the truss member 44 is mounted in the normal operation position (as seen in FIGS. 1 and 2) because the aperture 45 is bounded on all sides by the swing arm 22 and truss member 44. When the aperture 45 is closed, a portion of the drive belt 26 is trapped within the aperture 45 and the swing arm 22 and drive belt 26 are interlocked with each other in the same sense that the links of a conventional chain are interlocked with each other.

Removal of the truss member 44 facilitates removal of the drive belt 26 from the motorcycle 10 as a continuous unbroken loop without the need to break the loop or drop the transmission 16. When the truss member 44 is removed (as seen in FIG. 3), the aperture 45 is said to be "open" because it is not bounded on all sides by the swing arm 22 and truss member 44.

What is claimed is:

1. A motorcycle comprising:
    a frame;
    an engine/transmission assembly mounted to said frame, said engine/transmission assembly including an output shaft that rotates in response to operation of said engine/transmission assembly;
    a steering assembly mounted to said frame;
    a front wheel rotatably mounted to said steering assembly;
    a swing arm pivotably mounted to at least one of said frame and engine/transmission assembly, said swing arm including front and rear portions;
    a truss member removably mounted to said swing arm between said front and rear portions of said swing arm, wherein said swing arm and said truss member together define a drive member aperture, said truss member being removable for selectively opening said drive member aperture, said drive member aperture being closed during normal operation of said motorcycle;
    a rear wheel rotatably mounted to said swing arm; and
    a flexible drive member operatively interconnecting said output shaft and said rear wheel to cause rotation of said rear wheel in response to operation of said engine/transmission assembly, a portion of said drive member extending through said drive member aperture;
    wherein said flexible drive member is removable from said motorcycle in a continuous unbroken loop by removing said truss member from said swing arm.

2. The motorcycle of claim 1, wherein said flexible drive member includes a belt.

3. The motorcycle of claim 1, wherein said swing arm defines at least one substantially vertical mounting surface and said truss member defines at least one substantially vertical mounting surface mating with said at least one vertical mounting surface of said swing arm.

4. The motorcycle of claim 3, wherein said at least one vertical mounting surface of said swing arm includes first and second vertical mounting surfaces, and wherein said at least one vertical mounting surface of said truss member includes third and fourth vertical mounting surfaces, said first and third vertical mounting surfaces mating with each other and said second and fourth vertical mounting surfaces mating with each other.

5. The motorcycle of claim 3, wherein said swing arm defines at least one threaded bore in its vertical mounting surface, and wherein said truss member includes a bore extending through its vertical mounting surface, said motorcycle further comprising a horizontally-oriented fastener extending through said bore in said truss member and threaded into said threaded bore in said swing arm.

6. The motorcycle of claim 5, wherein said swing arm includes at least one substantially horizontal support surface for supporting said truss member and reducing shear stress on said fastener.

7. The motorcycle of claim 1, wherein said truss portion is pivotably mounted to said swingarm and pivotably movable to open and close said drive member aperture.

8. A motorcycle comprising:
    a frame;
    an engine/transmission assembly mounted to the frame, said engine/transmission assembly including an output shaft;
    a swing arm pivotably mounted to at least one of said engine/transmission assembly and frame, and including front and rear portions;
    a truss member removably mounted to said swing arm between said front and rear portions of said swing arm; and
    a wheel rotatably mounted to said swing arm and operatively interconnected with said output shaft to cause rotation of said wheel in response to operation of said engine/transmission assembly,
    wherein said truss member and swing arm together define a drive member aperture, said drive member aperture being in a closed condition when said truss member is mounted to said swing arm and being in an open condition when said truss member is removed from said swing arm, said motorcycle further comprising a flexible drive member operatively interconnecting said output shaft with said rear wheel, a portion of said flexible drive member extending through said drive member aperture such that said drive member and swing arm are interlocked when said drive member aperture is in said closed condition.

9. The motorcycle of claim 7, wherein said drive member defines a continuous unbroken loop, and wherein said drive member may be removed from said motorcycle without breaking said loop when said drive member aperture is in said open condition.

10. The motorcycle of claim 8, wherein said truss member is pivotably mounted to said swingarm and pivotably movable to open and close said drive member aperture.

11. A motorcycle swing arm comprising:
a first side defining a solid wall and adapted to extend along a first side of a wheel; and
a second side defining a drive member aperture therein and adapted to extend along a second side of a wheel opposite the first side thereof.

12. The swing arm of claim 9, wherein said second side of said swing arm includes first and second portions releasably fastened together to define said drive member aperture, said drive member aperture being in a closed condition when said first and second portions are fastened together and being in an open condition when said first and second portions are separated from each other.

13. The swing arm of claim 10, wherein said first and second portions each include at least one vertical mounting surface that mate together when said drive member aperture is in said closed condition.

14. The swing arm of claim 10, wherein said first portion includes at least one horizontal support surface for supporting said second portion.

15. The swing arm of claim 12, further comprising a substantially horizontally-oriented fastener fastening said first and second portions together, said horizontal support surface supporting said second portion to reduce stress on said fastener.

16. The swingarm of claim 12, wherein said first portion is pivotably mounted to said second portion and pivotably movable to open and close said drive member aperture.

17. A method for assembling a motorcycle, the method comprising:
providing a motorcycle frame;
mounting an engine/transmission assembly to the motorcycle frame;
providing a swing arm including front and rear portions;
providing a truss member removably mounted to the swing arm between the front and rear portions of the swing arm;
defining a closed drive member aperture when the swing arm and the truss member are mounted to each other;
pivotably mounting the swing arm to at least one of the engine/transmission assembly and frame;
rotatably mounting a wheel to the swing arm;
removing the truss member from the swing arm to open the drive member aperture;
providing a flexible drive member defining a continuous unbroken loop;
operatively interconnecting the flexible drive member between the wheel and the engine/transmission assembly such that the wheel rotates in response to operation of the engine/transmission assembly; and
interlocking the flexible drive member and swing arm by mounting the truss member to the swing arm to close the drive member aperture around a portion of the drive member.

18. The method of claim 14, further comprising providing substantially vertical mating surfaces on each of the truss member and the swing arm, wherein the act of interlocking includes positioning the vertical mating surfaces of the truss member and swing arm adjacent each other and fastening the truss member and swing arm together at the mating surfaces.

19. The method of claim 17, wherein said act of removing the truss member includes pivotably mounting the truss member to the swing arm and pivotably moving the truss member with respect to the swing arm to open the drive member aperture.

20. A method for removing a drive member from a motorcycle that includes a swing arm having front and rear portions, a truss member removably mounted to the swing arm between the front and rear portions, the truss member and swing arm removably mounted to each other to define a drive member aperture, a drive member describing a continuous unbroken loop having a portion extending through the drive member aperture, the swing arm and drive member being interlocked when the drive member aperture is closed, and a rear wheel that is interconnected with an engine/transmission assembly of the motorcycle by way of the drive member, the method comprising:
removing the truss member from the swing arm to open the drive member aperture; and
removing the drive member as a continuous unbroken loop from the motorcycle.

21. The method of claim 20, wherein said act of removing the truss member includes pivotably mounting the truss member to the swing arm and pivotably moving the truss member with respect to the swing arm to open the drive member aperture.

* * * * *